C. KIESER.
Meat-Cutter.
No. 219,272. Patented Sept. 2, 1879.
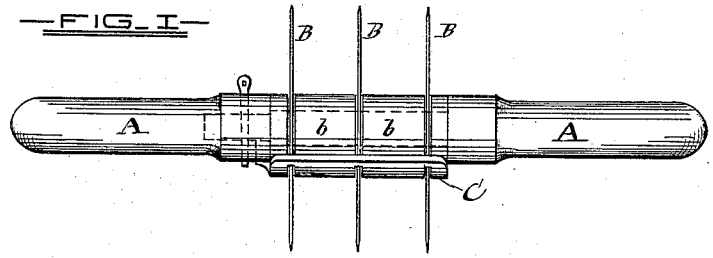
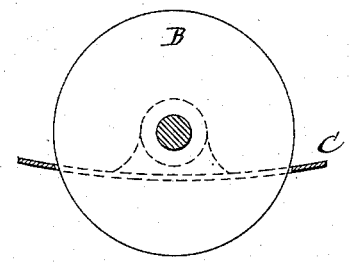
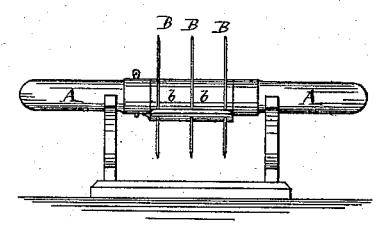

UNITED STATES PATENT OFFICE.

CHARLES KIESER, OF BALTIMORE, MARYLAND.

IMPROVEMENT IN MEAT-CUTTERS.

Specification forming part of Letters Patent No. 219,272, dated September 2, 1879; application filed May 29, 1879.

*To all whom it may concern:*

Be it known that I, CHARLES KIESER, of the city of Baltimore and State of Maryland, have invented certain Improvements in Meat-Cutting Devices, of which the following is a specification; and I do hereby declare that in the same is contained a full, clear, and exact description of my said invention, reference being had to the accompanying drawings, and to the letters of reference marked thereon.

This invention relates to a meat-cutter adapted specially for household use, but which may be employed in sausage-factories and other places where meats are chopped or cut into small pieces in large quantities.

The said cutter consists in a shaft, the ends of which are adapted to be held in the hands of the operator, and a system of circular knives placed upon the said shaft about the center thereof, which, as the device is moved over the surface of the block or board upon which the meat to be cut is placed, revolve independently of each other and of the said shaft.

The cutter is provided with collars to separate the circular knives and retain them at a proper distance apart, and with a shield-plate to prevent the meat clogging the spaces between the knives.

In the drawings forming a part hereof, Figure 1 is a side view of the improved meat-cutter, and Fig. 2 a cross-section of the same. Fig. 3 is a side view of the cutter on a reduced scale and a stand adapted to hold the device when the same is not in use.

Similar letters of reference indicate similar parts in all the views.

A is a shaft, the ends of which are adapted as handles. B B are circular knives placed loosely upon the shaft A, and are separated by the collars b.

In cutters for family use, to which only a light pressure is imparted in the meat-cutting operation, the collars b are separated from the knives; but when the cutter is designed for factory use I prefer to secure the collars to the knives, in order to prevent undue wear of the shaft.

C is the shield-plate, attached rigidly to the shaft A in any suitable manner, and provided with slits, which embrace both sides of the knives and serve to scrape and clean the same. This shield-plate prevents the meat clogging the upper part of the space between the knives, and thereby greatly facilitates the meat-cutting operation.

I am aware that in confectionery-making machinery a series of circular knives has been mounted on a frame carrying also a series of scrapers or prongs extending between the respective pairs of knives; but said scrapers or prongs are not, as in my invention, mounted upon the knife-shaft, and would not be adapted, by reason of their not extending beyond the circumference of the knives, to prevent a clogging of the same by meat, should it be attempted to use the machine for the purpose for which my invention is specially intended.

I am also aware that in mincing-machines operated by crank and gearing, scrapers or prongs, such as are above referred to, have been used in connection with circular knives; but in such machines the scrapers have not been placed on the knife-shaft, or under the same, as in my invention, and will not therefore prevent the minced meat from ascending from the tray, which, in fact, in such machines is no detriment to their operation.

In my machine, which is operated by hand, after the manner of a dough-rolling pin, the importance of keeping the knives clear about their axle or shaft is obvious.

I therefore disclaim the combination of circular knives and scrapers, except when combined substantially in accordance with my description; but, Having described my invention, what I claim as new, and wish to secure by Letters Patent of the United States, is—

A portable or hand meat-cutter consisting of a shaft, the ends of which form handles, combined with circular knives and collars separating the same, and a shield rigidly secured under and to said shaft, the said shield being provided with slits embracing both sides of the said knives, and serving to scrape or clean the same, substantially as set forth.

In testimony whereof I have hereunto subscribed my name this 27th day of May, A. D. 1879.

CHARLES KIESER.

Witnesses:
WM. C. NICHOLLS,
JNO. T. MADDOX.